(12) United States Patent
Ilchenko et al.

(10) Patent No.: US 7,362,927 B1
(45) Date of Patent: Apr. 22, 2008

(54) TUNABLE RF OR MICROWAVE PHOTONIC FILTERS USING TEMPERATURE-BALANCED WHISPERING GALLERY MODE OPTICAL RESONATORS

(75) Inventors: Vladimir Ilchenko, Arcadia, CA (US); Dmitri A. Kossakovski, S. Pasadena, CA (US); Ismail Tolga Yilmaz, Orlando, FL (US); Danny Eliyahu, Pasadena, CA (US); Nikolai Morozov, Valley Village, CA (US); Mark Henderson, LaVerne, CA (US)

(73) Assignee: OEwaves, Inc., Pasadena, CA (US)

( * ) Notice: Subject to any disclaimer, the term of this patent is extended or adjusted under 35 U.S.C. 154(b) by 499 days.

(21) Appl. No.: 11/143,921

(22) Filed: Jun. 1, 2005

Related U.S. Application Data

(60) Provisional application No. 60/576,143, filed on Jun. 1, 2004.

(51) Int. Cl.
*G02B 6/26* (2006.01)
(52) U.S. Cl. .............................. 385/15; 385/27; 385/30; 385/39; 385/50
(58) Field of Classification Search .................. 385/15, 385/27, 30, 39, 50
See application file for complete search history.

(56) References Cited

U.S. PATENT DOCUMENTS

| | | | |
|---|---|---|---|
| 5,204,640 A | 4/1993 | Logan | |
| 5,220,292 A | 6/1993 | Bianchini et al. | |
| 5,723,856 A | 3/1998 | Yao et al. | |
| 5,777,778 A | 7/1998 | Yao | |
| 5,917,179 A | 6/1999 | Yao | |
| 5,929,430 A | 7/1999 | Yao et al. | |
| 5,985,166 A | 11/1999 | Unger et al. | |
| 6,080,586 A | 6/2000 | Baldeschwieler et al. | |
| 6,138,076 A | 10/2000 | Graf et al. | |
| 6,178,036 B1 | 1/2001 | Yao | |
| 6,203,660 B1 | 3/2001 | Unger et al. | |
| 6,389,197 B1 | 5/2002 | Iltchenko et al. | |
| 6,417,957 B1 | 7/2002 | Yao | |
| 6,473,218 B1 | 10/2002 | Maleki et al. | |
| 6,476,959 B2 | 11/2002 | Yao | |
| 6,487,233 B2 | 11/2002 | Maleki et al. | |
| 6,488,861 B2 | 12/2002 | Iltchenko et al. | |
| 6,490,039 B2 | 12/2002 | Maleki et al. | |
| 6,535,328 B2 | 3/2003 | Yao | |
| 6,567,436 B1 | 5/2003 | Yao et al. | |
| 6,580,532 B1 | 6/2003 | Yao et al. | |
| 6,594,061 B2 | 7/2003 | Huang et al. | |
| 6,762,869 B2 | 7/2004 | Maleki et al. | |
| 6,795,481 B2 | 9/2004 | Maleki et al. | |

(Continued)

FOREIGN PATENT DOCUMENTS

WO    2005/055412    6/2005

OTHER PUBLICATIONS

Matsko, et al., "Whispering gallery mode based optoelectronic microwave oscillator", *Journal of Modern Optics*, vol. 50, No. 15-17, pp. 2523-2542, 2003.

(Continued)

*Primary Examiner*—Quyen P Leung
(74) *Attorney, Agent, or Firm*—Fish & Richardson P.C.

(57) ABSTRACT

Devices and techniques for filtering RF or microwave frequencies by optical filtering using a tunable optical filter.

20 Claims, 5 Drawing Sheets

U.S. PATENT DOCUMENTS

| | | | |
|---|---|---|---|
| 6,853,479 | B1 | 2/2005 | Ilchenko et al. |
| 6,871,025 | B2 | 3/2005 | Maleki et al. |
| 6,873,631 | B2 | 3/2005 | Yao et al. |
| 6,879,752 | B1 | 4/2005 | Ilchenko et al. |
| 6,901,189 | B1 | 5/2005 | Savchenkov et al. |
| 6,922,497 | B1 * | 7/2005 | Savchenkov et al. ......... 385/15 |
| 2002/0018611 | A1 | 2/2002 | Maleki et al. |
| 2003/0012504 | A1 | 1/2003 | Iltchenko |
| 2004/0100675 | A1 | 5/2004 | Matsko et al. |
| 2004/0218880 | A1 | 11/2004 | Matsko et al. |
| 2004/0240781 | A1 | 12/2004 | Savchenkov et al. |
| 2005/0017816 | A1 | 1/2005 | Ilchenko et al. |
| 2005/0074200 | A1 | 4/2005 | Savchenkov et al. |

OTHER PUBLICATIONS

Ilchenko, et al., "Whispering-gallery-mode electro-optic modulator and photonic microwave receiver", *J. Opt. Soc. Am. B.*, vol. 20, No. 2, pp. 333-342, Feb. 2003.

Braginsky, et al., "Quality-Factor and Nonlinear Properties or Optical Whispering-Gallery Modes", *Physics Letters A*, vol. 137, Nos. 7, 8, pp. 393-397, May 29, 1989.

Matsko, et al., "Active mode locking with whispering-gallery modes", *J. Opt. Soc. Am. B.*, vol. 20, No. 11, pp. 2292-2296, Nov. 2003.

Gorodetsky, et al., "Rayleigh scattering in high-Q microspheres", *J. Opt. Soc. Am. B*, vol. 17, No. 6, pp. 1051-1057, Jun. 2000.

Vassiliev, et al., "Narrow-line-width diode laser with a high-Q microsphere resonator", *Optics Communications*, vol. 158, pp. 305-312, Dec. 15, 1998.

Yao, et al., "A Novel Photonic Oscillator", *IEEE/LEOS 1995 Summer Topical Meetings*, Keystone, Colorado, Aug. 9-11, 2005.

Ilchenko, et al., "Tunability and synthetic lineshapes in high-Q optical whispering gallery modes", *Proc. Of SPIE*, vol. 4969, pp. 195-206, 2003.

Hryniewicz, et al., "Higher Order Filter Response in Coupled Microring Resontors", *IEEE Photonics Technology Letters*, vol. 12, No. 3, pp. 320-323, Mar. 2000.

Kudryashov, et al., "Laser Resonators III", *Proceedings of SPIE*, vol. 3930, pp. 154-162, San Jose, California, Jan. 26-28, 2000.

Logan, et al.; Stabilization of Oscillator Phase Using a Fiber-Optic Delay-Line; 1991; 45th Annual Symposium on Frequency Control; pp. 508-512.

L.E. Myers, et al.; Quasi-phase-matched optical parametric oscillators in bulk periodically poled $LiNbO_3$; Nov. 1995; J.Opt. Soc. Am. B/vol. 12, No. 11; pp. 2102-2116.

X. Steve Yao, et al.; Converting Light into Spectrally Pure Microwave Oscillation; Apr. 1996; Optics Letters, vol. 21, No. 7; pp. 483-485.

H. Ito, et al.; InP/InGaAs uni-travelling-carrier photodiode with 310 GHz receiver; Oct. 12, 2000; Electronics Letters, vol. 36, No. 21; pp. 1809-1810.

V. Ilchenko, et al.; Sub-Micro Watt Photonic Microwave Receiver; Nov. 2002; IEEE Photonics Technology Letters, vol. 14, No. 11; pp. 1602-1604.

* cited by examiner

FIG. 1A
Optical Spectrum of Modulated Optical Beam
Carrying RF or Microwave Signal
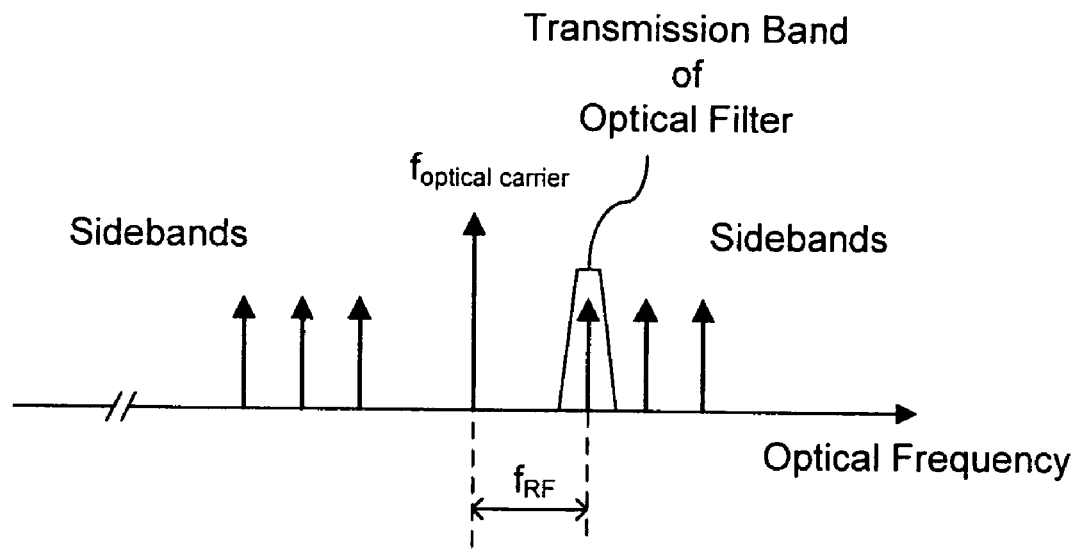
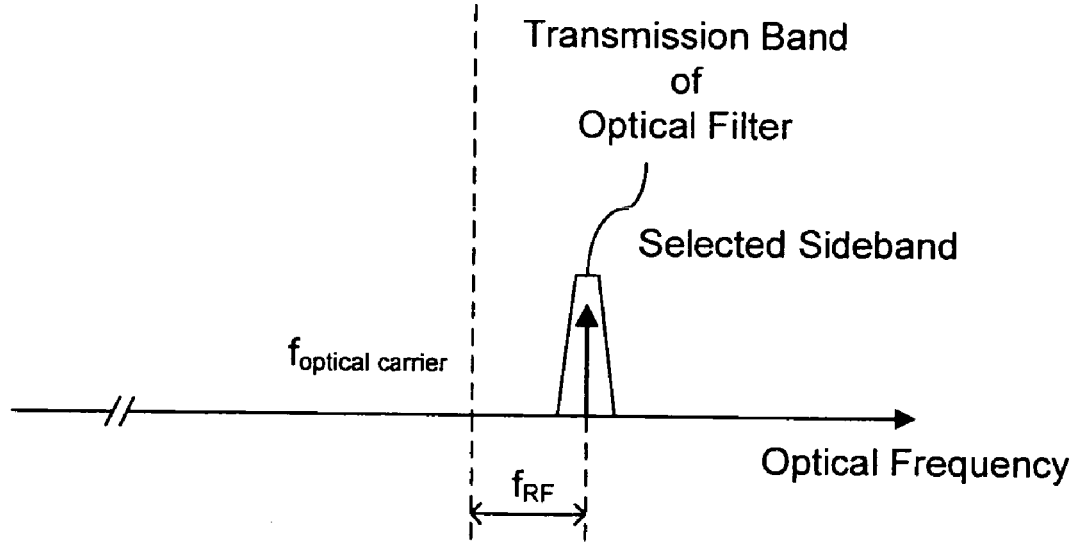
Optical Spectrum of Modulated Optical Beam
After Optical Filtering
FIG. 1B

US 7,362,927 B1

TUNABLE RF OR MICROWAVE PHOTONIC FILTERS USING TEMPERATURE-BALANCED WHISPERING GALLERY MODE OPTICAL RESONATORS

This application claims the benefit of U.S. Provisional Patent Application No. 60/576,143 entitled "PHOTONIC MICROWAVE FILTER BASED ON TEMPERATURE-BALANCED LITHIUM NIOBATE WHISPERING GALLERY MODE MICRO-RESONATOR OPTICAL FILTERS" and filed on Jun. 1, 2004 which is incorporated herein by reference as part of the specification of this application.

BACKGROUND

This application relates to optical and photonic devices for various applications, such as optical, radio frequency (RF), and microwave applications.

Optical devices may be used to manipulate or control light for applications where signals are not in the optical frequencies. As an example, RF and microwave oscillators for generating signals in the RF and microwave frequencies may be constructed as "hybrid" devices by using both electronic and optical components to form opto-electronic oscillators ("OEOs"). See, e.g., U.S. Pat. Nos. 5,723,856, 5,777,778, 5,929,430, and 6,567,436. As another example, tunable RF and microwave filters may be designed to filter RF and microwave signals by optical filtering of the modulated light to select one or more desired microwave or RF spectral components as the filtered output.

SUMMARY

This application describes, among others, tunable RF or microwave filters based on signal filtering and tuning in the optical domain using two whispering gallery mode (WGM) resonators. In one implementation, for example, first and second WGM optical resonators are placed on a common base to be close to each other so that resonances of the first and second WGM optical resonators drift together with temperature to be thermally stable relative to each other. The first WGM optical resonator is used as a filter inside a laser resonator of a laser to filter laser light in the laser resonator to be at a laser carrier frequency. The laser beam out of the laser is split into a first laser beam and a second laser beam. An input RF or microwave signal is applied to an optical modulator to modulate the second laser beam to produce a modulated beam that carries the input RF or microwave signal as optical sidebands at optical frequencies different from the laser carrier frequency. The modulated beam is then directed through the second WGM optical resonator to produce a filtered optical beam. The resonance frequency of the second WGM optical resonator is tuned to select one of the optical sidebands in the modulated beam and to reject other optical sidebands and the laser carrier frequency so that the filtered optical beam has only the selected optical sideband. An optical detector is used to combine and detect the filtered optical beam and the first optical beam and to produce an output signal. This signal carries signal information in the selected optical sideband at an RF or microwave frequency equal to a difference between the laser carrier frequency and an optical frequency of the selected optical sideband.

In another implementation, a device described in this application includes a laser which includes a laser resonator, an optical gain medium in the laser resonator, and a WGM optical resonator in the laser resonator with a resonance at a laser carrier frequency to filter laser light in the laser resonator. An optical coupler is used to split the laser beam out of the laser into a first laser beam and a second laser beam. This device uses an optical modulator to receive the first laser beam and an input electrical signal, and to modulate the first laser beam in response to the input electrical signal to produce a modulated optical beam carrying optical sidebands at optical frequencies different from the laser carrier frequency. A second WGM optical resonator is also used to receive the modulated optical beam and is tunable to change in frequency in response to a resonator control signal to filter the modulated optical beam by selecting one of the optical sidebands to transmit as a filtered optical signal and rejecting other optical sidebands and the laser carrier frequency. The device further includes an optical detector to receive the filtered optical signal and the second optical beam and to produce an output signal carrying signal information in the selected optical sideband at a frequency equal to a difference between the laser carrier frequency and an optical frequency of the selected optical sideband. In the above device, a base may be used to hold the WGM optical resonator and the second WGM optical resonator in a close proximity with each other to make resonances of the WGM optical resonator and the second WGM optical resonator drift in the same way with a temperature.

These and other implementations and their applications are described in greater detail in the attached drawings, the following detailed description, and the claims.

BRIEF DESCRIPTION OF DRAWINGS

FIGS. 1A and 1B illustrate optical filtering of optical sidebands in a modulated optical carrier beam that carries an RF signal to be filtered.

DETAILED DESCRIPTION

Figure 2:
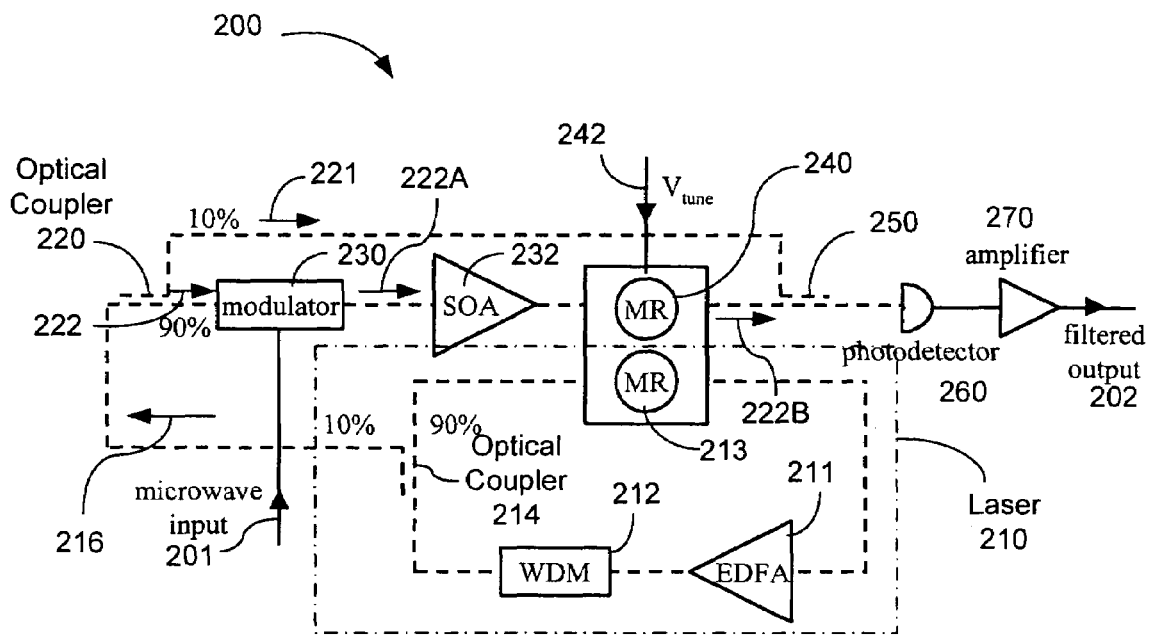
FIG. 2 shows one exemplary implementation of a microwave or RF photonic filter based on the optical filtering shown in FIGS. 1A and 1B and using two WGM optical resonators to provide relative thermal stability between the laser carrier frequency and the center frequency of the optical filter.
Figure 3:
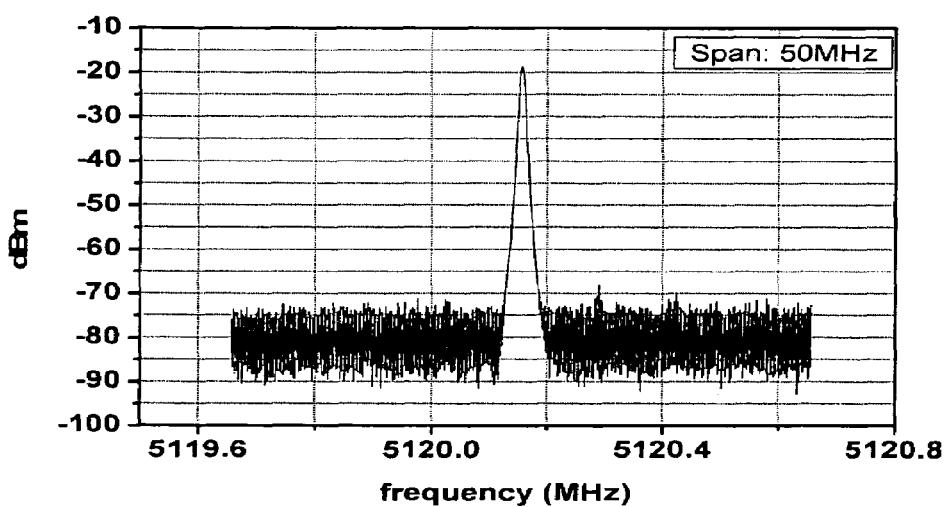
FIG. 3 shows the spectrum of a microwave signal near 5.12 GHz after passing through the photonic microwave filter in FIG. 2.
Figure 4:
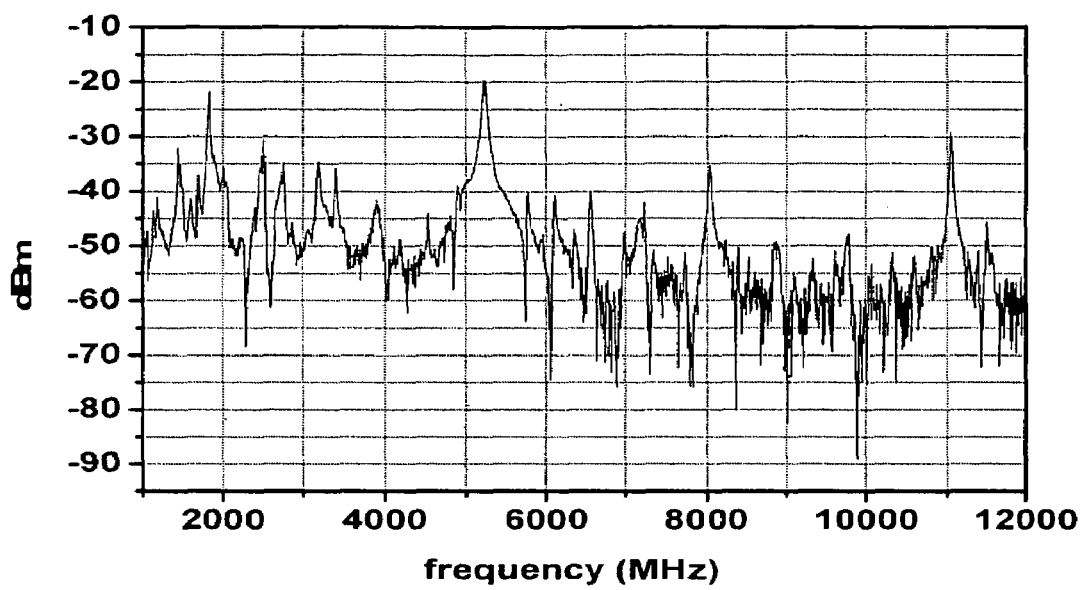
FIG. 4 shows the S21 measurement of the photonic microwave filter in FIG. 2 performed with a network analyzer where the main transmission peak is near 5.12 GHz.
Figure 5:
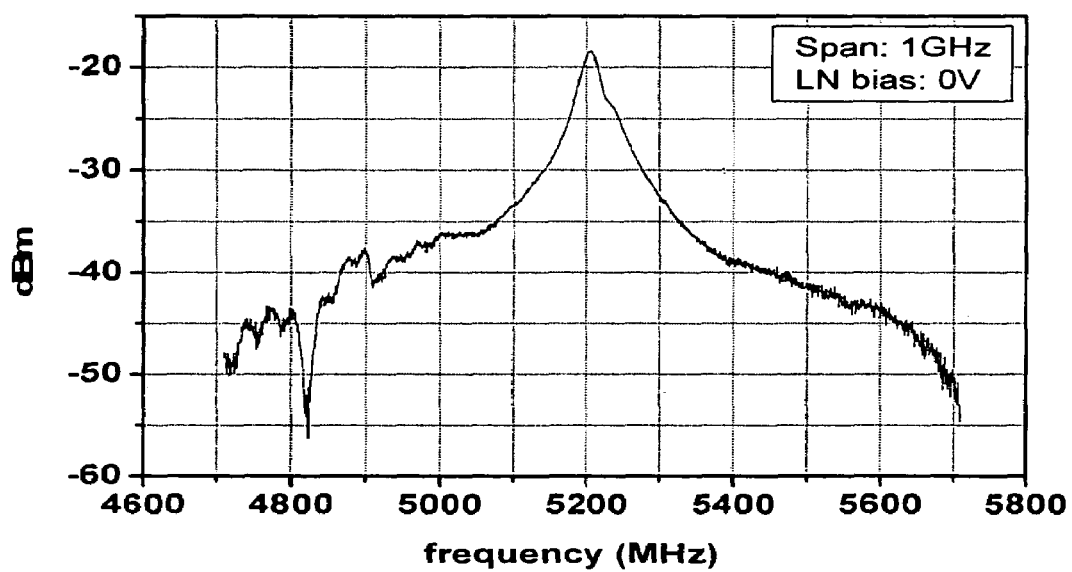
FIG. 5 shows the S21 measurement of the photonic microwave filter in FIG. 2 performed with a network analyzer where the main transmission peak is near 5.12 GHz.
Figure 6:
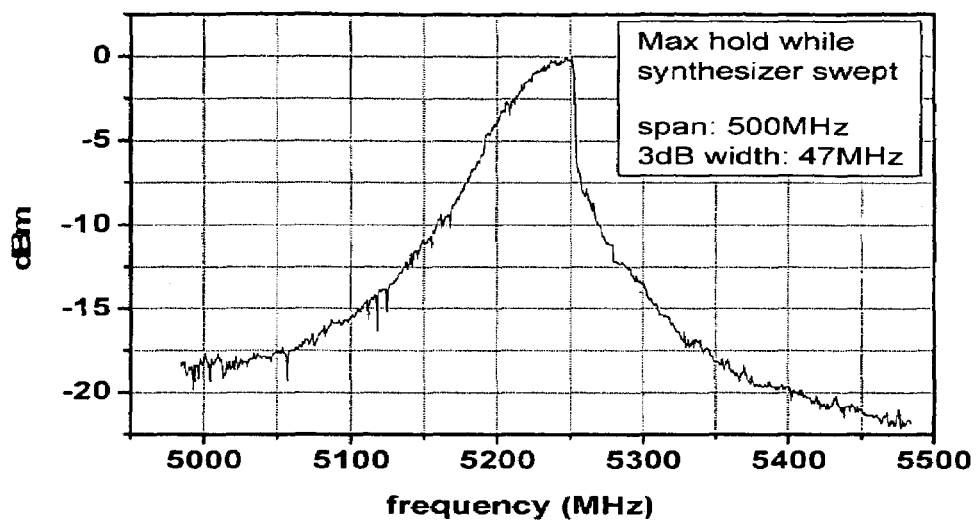
FIG. 6 shows a high resolution spectral profile measurement of the photonic microwave filter in FIG. 2 at the main transmission peak near 5.12 GHz where the measurement was made with a manually swept in steps of 1M Hz by a signal generator and an RF spectrum analyzer was in the max hold mode.
Figure 7:
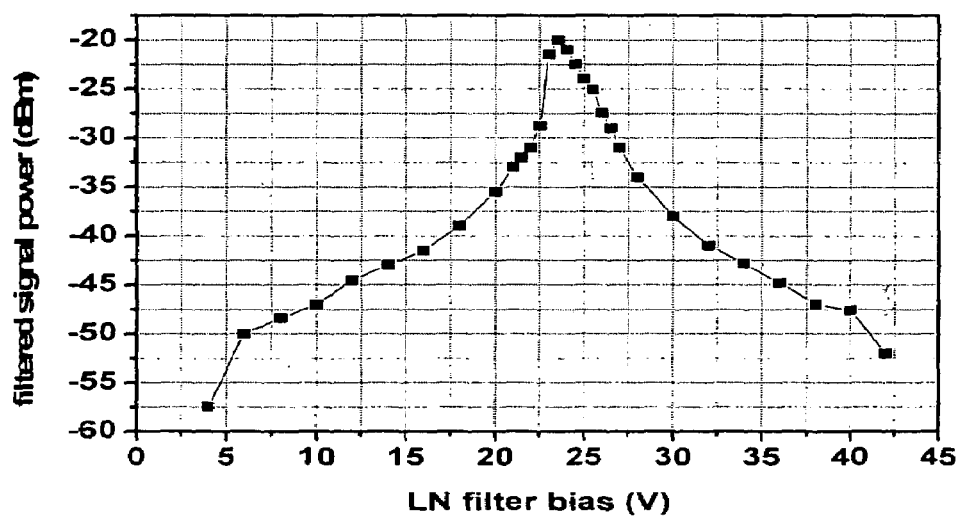
FIG. 7 shows the measured throughput of the photonic microwave filter in FIG. 2 at the main transmission peak near 5.12 GHz as a function of the bios voltage applied to the lithium niobate micro-resonator filter.

Filtering of a microwave or RF signal by optical filtering can be achieved in two steps. FIG. 1A shows the first step where an optical CW beam at a laser carrier frequency is modulated to produce a modulated beam that carries an input microwave or RF signal as optical sidebands. The optical carrier is shown to be at the laser carrier frequency ($f_{optical\ carrier}$) and the RF or microwave signal bands or spectral components of an input RF or microwave signal to be filtered are now carried by the optical carrier as optical sidebands away from the laser carrier frequency. The second step is to use a tunable optical filter to optically filter the modulated beam to produce a filtered optical beam. The tuning of the filter's transmission band allows selection of a desired optical sideband. If the quality factor of the optical filter is sufficiently high, the bandwidth of the optical filter can be sufficiently narrow to select only one sideband to transmit while rejecting two neighboring sidebands, all other sidebands and the optical carrier. Some filters based on such optical filtering are described in the PCT Application No. PCT/US05/00895 entitled "Tunable Radio Frequency and Microwave Photonic Filters" and filed on Jan. 12, 2005 (published as PCT Publication No. WO2005/067690) and U.S. application Ser. No. 11/034,232 "Tunable Radio Frequency and Microwave Photonic Filters" and filed on Jan. 11, 2005 (published as U.S. Publication No. 2005/0175358). The entire disclosures of both applications are incorporated herein by reference as part of the specification of this application. FIG. 1B shows that the optical filter is tuned to select the lowest sideband of the upper sidebands in the modulated optical beam. The filtered optical beam has only one spectral component at the optical frequency of ($f_{optical\ carrier}+f_{RF}$).

In order to accurately tune and maintain the center of the filter transmission at a selected optical sideband, the center of the filter transmission of the optical filter must be stable relative to the laser carrier frequency. When the optical filter and the laser which produces the laser carrier are two separate devices, such a relative stability in frequency can be difficult to achieve because two devices are in different environmental conditions that often independently or even randomly vary. One significant environment condition is the temperature which can cause thermal drift in the frequency of the laser or the resonance of the optical filter. Even if the two devices are separately thermally controlled, it can still be difficult to maintain the relative thermal stability of the two devices.

One simple and effective solution is to place the laser and the optical filter within the same thermal environment to minimize the relative thermal shift between the laser and the optical filter. In one implementation, one part of the laser that controls the laser carrier frequency may be selected and placed in a close proximity of the optical filter to be in the same thermal environment so that the effect of a change in temperature on both the laser carrier frequency and the center frequency of the transmission of the optical filter is the substantially the same and both frequencies drift together while the relative frequency difference between their resonances remain constant. When implemented, this mechanism provides good long term thermal stability of the photonic filters.

FIG. 2 shows one exemplary implementation of a microwave or RF photonic filter 200 using two WGM optical resonators 213 and 240 to provide relative thermal stability between the laser carrier frequency controlled by the WGM resonator 213 and the center frequency of the optical filtering by the WGM resonator 240. The filter 200 is a two-port filter for RF or microwave signals: an input port to receive an input RF or microwave signal 201 and an output port for exporting filtered RF or microwave signal 202. The filter 200 in the illustrated example includes a laser 210, an optical modulator 230 and an optical detector or photodetector 260 that operate in combination to perform the filtering the input RF or microwave signal 201.

The laser 210 produces a CW laser carrier beam 216 at the laser carrier frequency. The laser 210 may be a ring laser as illustrated with an optical gain medium 211 which may be an erbium-doped fiber amplifier and the laser 210 may be a fiber ring laser. A wavelength division multiplexing filter 212 may be used in the laser 210. An optical coupler 214 may be used to split a portion of the laser light as the output laser carrier beam 216. An optical splitter 220 is used to split the laser carrier beam 216 into a first beam 221 and a second beam 222. The second beam 222 is directed into the modulator 230 to be modulated to produce a modulated beam 222A. The modulator 230 is designed to be controlled by the input RF or microwave signal 201 and modulates the beam 222 in response to the signal 201 to carry the signal 201 in form of optical sidebands in the modulated beam 222A. The spectrum of the modulated beam 222A is similar to the spectrum in FIG. 1A. The WGM optical resonator 240 is a tunable WGM resonator and is positioned to filter the modulated signal 222A to produce a filtered beam 222B with only one selected optical sideband while rejecting all other optical components in the beam 222A. This optical filtering is used to perform the RF or microwave filtering. Next, the first beam 221 and the filtered beam 222A are combined at the optical detector 260 and beat with each other to produce a detector output as a filtered RF or microwave signal 202 containing the information on the selected optical sideband. An optical coupler 250 may be used to combine the beams 221 and 222B. An RF or microwave signal amplifier 270 may be optionally used to amplify the detector output. The modulated optical beam 222A may also be amplified by an optional optical amplifier 232 placed between the modulator 230 and the WGM optical resonator 240, e.g., a semiconductor optical amplifier (SOA). Because the intracavity WGM resonator 213 selects and dictates the laser carrier frequency of the laser 201, the relative thermal stability between the WGM optical resonator 240 and the laser 210 is achieved by placing the intracavity WGM optical resonator 213 and the resonator 240 in a close proximity on the same base 280 so that they are essentially in the same thermal environment. The base 280 for holding both resonators 213 and 240 may a material with a high thermal conductivity. For example, a metal such as brass may be used to construct the base 280. Both resonators 213 and 240 are located as close as possible to each other on the same metal base 280 to reduce residual temperature difference between them. This design avoids the need to control the thermal condition of the entire laser and simplifies the thermal control.

As a specific implementation, the resonators 213 and 240 may be implemented as a pair of temperature-balanced lithium niobate (LN) whispering gallery mode microresonator (MR) filters as the two WGM resonators 240 and 213. Both resonators 240 and 213 are used as optical filters but provide different optical filtering functions. The resonator 240 performs an optical tuning and filtering for RF or microwave tuning and filtering. The resonator 213, on the other hand, is used to reduce optical noise of the laser 210 and to make the laser 210 lase at the resonance frequency of the resonator 213. As the resonator 213 is tuned, the laser carrier frequency is tuned. The free spectral ranges (FSRs) and thus the absolute frequencies of the transmission peaks of the LN MR filters depend on control voltages applied to the MR filters and their temperatures. As illustrated, two MR filters made of lithium niobate spheres of radii of 1.5 mm with nominally matched FSRs are placed on the same base in a close proximity so that temperature fluctuations seen by the two MR filters are made to be the same. This design, in turn, causes the fluctuations of the transmission peaks of the two LN MR filters to be the same. One of the MR filters, the filter 213, is used as the frequency selective element in the external cavity laser (ECL) 210. The ECL 210 is the source laser or local oscillator for the microwave filter 200. The output from the ECL 200 is split into two beams using an optical splitter 220, e.g., a fiber optic power splitter. The first beam 221 from the splitter 220 is not modulated. The second beam from the splitter 220 is modulated using an electro-optic modulator 230 such as a Mach-Zehnder intensity modulator by the input microwave signal 214 that is to be filtered. After amplification by an optical amplifier 232, one modulation sideband of the modulated optical signal is filtered by the second LN MR filter 240. The transmission peak of this LN MR filter 240 can be tuned by a control voltage 242 ($V_{tune}$) applied to its electrodes. The first output beam 221 from the fiber optic power splitter 220 is combined with the filtered sideband signal 222A and mixed in a photodetector 260. The resulting microwave signal produced by the photodetector is the filtered version of the input microwave signal 201 that is used to modulate the electro-optic modulator 230. The benefit of this approach is that the LN MR that acts as the photonic microwave filter 240 does not need to be actively stabilized to the optical frequency of the source laser 210. This is because the frequency of the laser 210 and the transmission peak of the LN MR sideband filter 240 drift together due to the temperature balanced nature of the two LN MR filters 240 and 213. As a result, the photonic microwave filter 200 exhibits inherent long term stability.

Figure 8:
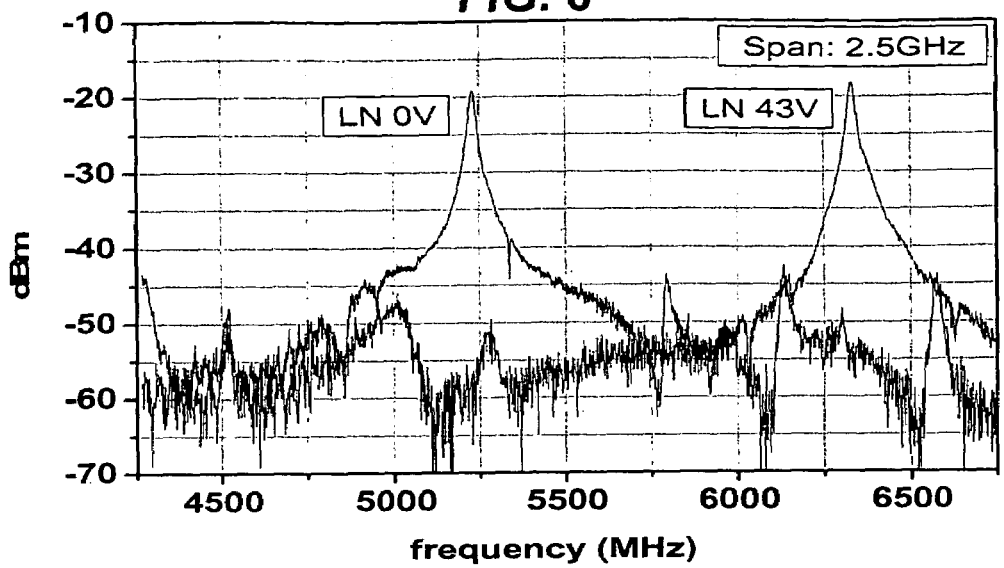
FIG. 8 shows the S21 measurement of the photonic microwave filter in FIG. 2 where the main transmission peak is tuned at two different frequencies for two different bias voltages on the lithium niobate micro-resonator filter.

FIGS. 3-7 show measurements of the spectrum, transmission measurement S21, and throughput of a photonic microwave filter based on the design in FIG. 2 in filtering a microwave signal near 5.12 GHz. A brass metal base was used to hold the two microresonators. FIG. 8 further shows S21 measurements of the same filter in tuning the filter 240 by controlling the bias voltage on the lithium niobate of the filter 240 from 0 V to 43 V.

The tunable resonators 240 and 213 may be implemented in various whispering gallery mode (WGM) resonator configurations, including but not limited to, microsphere WGM resonators, microdisk WGM resonators with spherical and non-spherical exterior surfaces, and microring WGM resonators with spherical and non-spherical exterior surfaces. The non-spherical exterior surfaces may be spheroidal surfaces of spheroids or conic surfaces. See, e.g., U.S. Pat. No. 6,795,481, the entire disclosure of which is incorporated herein by reference as part of the specification of this application. The tuning of a WGM resonator may be achieved by various techniques. One is thermal control of the resonator whose index, dimension, or both change with temperature, mechanical control of the resonator by changing the dimension of the resonator, electrical control, or optical control. Electro-optic materials may be used to control and tune the resonance frequency of the WGM resonator by an external control signal.

Figure 9A:
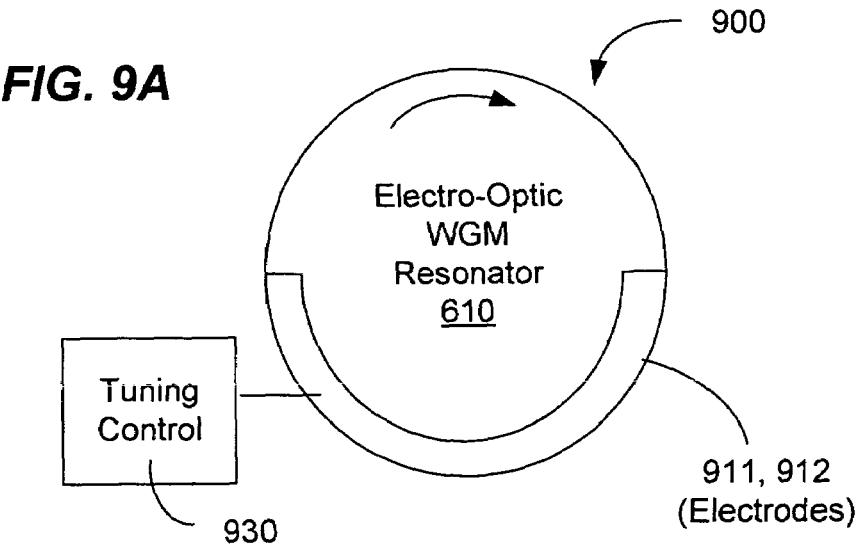
FIGS. 9A and 9B show one example of a tunable electro-optic WGM resonator suitable for use in the photonic filter in FIG. 2.
Figure 9B:
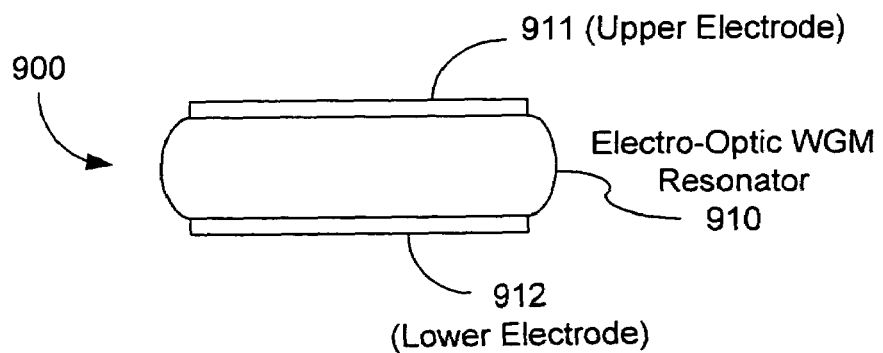

FIGS. 9A and 9B show an example of a tunable electro-optic WGM resonator 900 having a WGM resonator 910. The electro-optic material for the entire or part of the resonator 910 may be any suitable material, including an electro-optic crystal such as lithium niobate and semiconductor multiple quantum well structures. One or more electrodes 911 and 912 may be formed on the resonator 910 to apply a control electrical field in at least the region where the WG modes are present to control the index of the electro-optical material and to change the filter function of the resonator. Assuming the resonator 910 has disk or ring geometry, the electrode 911 may be formed on the top of the resonator 910 and the electrode 912 may be formed on the bottom of the resonator 610 as illustrated in the side view of the device in FIG. 9B. In one implementation, the electrodes 911 and 912 may be microstrip line electrodes. A tuning control unit 930 such as a control circuit may be used to supply the electrical control signal to the electrodes 911 and 912. In operating the tunable resonator 900, the control unit 930 supplies a voltage as the electrical control signal to the electrodes 911 and 912. The control voltage may be a DC voltage to set the resonance peak of the resonator 900 at a desired spectral location. The DC voltage may be adjusted by the control unit 930 to tune the spectral position of the transmission peak when such tuning is needed. For dynamic tuning operations, the control unit 630 adjusts the control voltage in response to a control signal to, e.g., maintain the transmission peak at a desired spectral position or frequency or to change the frequency of the transmission peak to a target position. In some other operations, the control unit 930 may adjust the control voltage in a time varying manner, e.g., scanning the transmission peak at a fixed or varying speed or constantly changing the transmission peak in a predetermined manner.

For example, a Z-cut $LiNbO_3$ disk cavity with a diameter of d=4.8 mm and a thickness of 170 μm may be used as the resonator 910. The cavity perimeter edge may be prepared in the toroidal shape with a 100 μm radius of curvature. As an alternative to the strip electrodes shown in FIG. 9A, the top and bottom surfaces of the disk resonator may be coated with conductive layers for receiving the external electrical control signal. A metal such as indium may be used to form the conductive coatings. Tuning is achieved by applying and adjusting a voltage to the top and bottom conductive coatings. Each conductive coating may be absent in the central part of the resonator and are present at the perimeter edge of the resonator where WGMs are localized.

In summary, only a few implementations are disclosed. However, it is understood that variations and enhancements may be made.

What is claimed is:

1. A device, comprising:
   a laser comprising a laser resonator, an optical gain medium in the laser resonator, and a whispering gallery mode (WGM) optical resonator in the laser resonator with a resonance at a laser carrier frequency to filter laser light in the laser resonator;
   an optical coupler to split the laser beam out of the laser into a first laser beam and a second laser beam;
   an optical modulator to receive the first laser beam and an input electrical signal, the optical modulator to modulate the first laser beam in response to the input electrical signal to produce a modulated optical beam carrying optical sidebands at optical frequencies different from the laser carrier frequency;
   a second WGM optical resonator to receive the modulated optical beam, tunable to change in frequency in response to a resonator control signal to filter the modulated optical beam by selecting one of the optical sidebands to transmit as a filtered optical signal and rejecting other optical sidebands and the laser carrier frequency; and an optical detector to receive the filtered optical signal and the second optical beam and to produce an output signal carrying signal information in the selected optical sideband at a frequency equal to a difference between the laser carrier frequency and an optical frequency of the selected optical sideband.

2. The device as in claim 1, further comprising:

a base on which the WGM optical resonator and the second WGM optical resonator are placed in a close proximity with each other to make resonances of the WGM optical resonator and the second WGM optical resonator drift in the same way with a temperature.

3. The device as in claim 2, wherein the base is made of a metal.

4. The device as in claim 1, wherein the second WGM optical resonator includes an electro-optic material and the resonator control signal is a control voltage which changes to tune optical transmission of the second WGM optical resonator.

5. The device as in claim 1, wherein the second WGM optical resonator includes a lithium niobate material.

6. The device as in claim 1, wherein the WGM optical resonator and the second WGM optical resonator are lithium niobate resonators.

7. The device as in claim 1, wherein the WGM optical resonator and the second WGM optical resonator have the same free spectra ranges.

8. The device as in claim 1, further comprising a wavelength-division multiplexing filter in the laser resonator to filter the laser light.

9. The device as in claim 1, wherein the optical gain medium comprises an erbium-doped fiber amplifier.

10. The device as in claim 1, further comprising a semiconductor optical amplifier between the optical modulator and the second WGM optical resonator to amplify the modulated optical beam.

11. The device as in claim 1, wherein the optical modulator is a Mach-Zehnder electro-optical modulator.

12. A method, comprising:

placing first and second whispering gallery mode (WGM) optical resonators on a common base to be close to each other so that resonances of the first and second WGM optical resonators drift together with temperature to be thermally stable relative to each other;

using the first WGM optical resonator as a filter inside a laser resonator of a laser to filter laser light in the laser resonator to be at a laser carrier frequency;

splitting a laser beam out of the laser into a first laser beam and a second laser beam;

applying an input RF or microwave signal to an optical modulator to modulate the second laser beam to produce a modulated beam that carries the input RF or microwave signal as optical sidebands at optical frequencies different from the laser carrier frequency;

directing the modulated beam through the second WGM optical resonator to produce a filtered optical beam;

tuning a resonance frequency of the second WGM optical resonator to select one of the optical sidebands in the modulated beam and to reject other optical sidebands and the laser carrier frequency so that the filtered optical beam has only the selected optical sideband; and using an optical detector to combine and detect the filtered optical beam and the first optical beam and to produce an output signal carrying signal information in the selected optical sideband at an RF or microwave frequency equal to a difference between the laser carrier frequency and an optical frequency of the selected optical sideband.

13. The method as in claim 12, wherein the second WGM optical resonator is an electro-optic WGM resonator and is tuned by controlling a bias voltage on the electro-optic WGM resonator.

14. The method as in claim 12, further comprising using a metal to construct the common base.

15. A device, comprising:

a laser to produce a laser carrier beam at a laser carrier frequency and comprising a whispering gallery mode (WGM) optical resonator inside the laser to control the laser carrier frequency;

an optical coupler to split the laser carrier beam out of the laser into a first laser beam and a second laser beam;

an optical modulator to modulate the first laser beam in response to an input electrical signal to produce a modulated optical beam carrying optical sidebands at optical frequencies different from the laser carrier frequency;

a second WGM optical resonator, placed in a close proximity with and thermally coupled to the WGM optical resonator, to receive the modulated optical beam and tunable to select one of the optical sidebands to output a filtered optical signal with only the selected one optical sideband; and an optical detector to receive the filtered optical signal and the second optical beam and to produce an output signal carrying signal information in the selected one optical sideband at a frequency equal to a difference between the laser carrier frequency and an optical frequency of the selected one optical sideband.

16. The device as in claim 15, wherein the second WGM optical resonator exhibits an electro-optical effect and is tuned by a control voltage.

17. The device as in claim 15, wherein the WGM optical resonator and second WGM optical resonator have matched free spectral ranges.

18. The device as in claim 15, wherein the second WGM optical resonator is a spheroid resonator.

19. The device as in claim 15, wherein the second WGM optical resonator is a disk resonator.

20. The device as in claim 15, further comprising a metal base on which the WGM optical resonator and second WGM optical resonator are placed in a close proximity to each other to minimize a difference in temperature between the WGM optical resonator and second WGM optical resonator.

* * * * *